United States Patent [19]

Ellis

[11] Patent Number: 5,152,572

[45] Date of Patent: Oct. 6, 1992

[54] RETRACTABLE CARPET PROTECTOR FOR VEHICLES

[76] Inventor: Larry D. Ellis, 113 Bluecrest Ave., Dayton, Ohio 45427

[21] Appl. No.: 741,587

[22] Filed: Aug. 7, 1991

[51] Int. Cl.⁵ .............................................. B60N 3/04
[52] U.S. Cl. ................... 296/97.23; 296/39.1
[58] Field of Search .................. 296/97.23, 37.16, 156, 296/39.1

[56] References Cited

U.S. PATENT DOCUMENTS

| | | | |
|---|---|---|---|
| 3,930,084 | 12/1975 | Shields | 296/97.23 |
| 4,195,875 | 4/1980 | Venne | 296/156 |
| 4,784,427 | 11/1988 | Burgess | 296/98 |
| 4,834,446 | 5/1989 | Tung-Chow | 296/136 |
| 4,842,323 | 6/1989 | Trickett | 296/98 |
| 4,968,548 | 11/1990 | Gibson et al. | 296/97.23 |
| 4,991,789 | 12/1991 | Buerger | 296/156 |
| 5,083,831 | 1/1992 | Foyen | 296/97.23 |

Primary Examiner—Robert R. Song
Attorney, Agent, or Firm—Biebel & French

[57] ABSTRACT

A protective mat is provided for use in a vehicle having an interior carpeted floor. One end of the mat is attached to a storage assembly including a rod and a housing for enclosing rod and the mat be stored in coiled fashion upon the rod within the housing. The opposite end of the mat is provided with fasteners which, when engaged with the pile of the carpeted floor, attach the mat to the floor to prevent movement in a direction parallel to the floor.

17 Claims, 4 Drawing Sheets

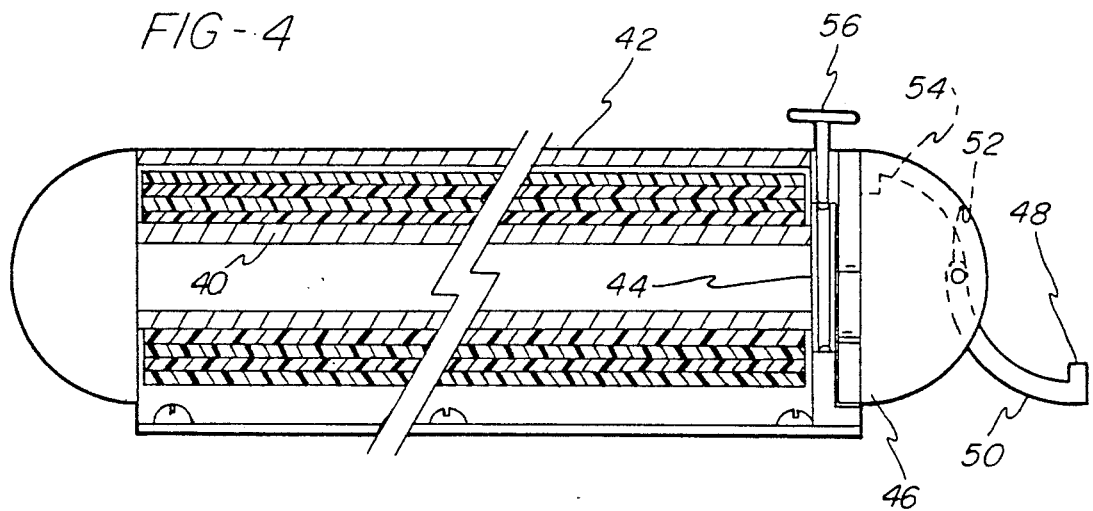
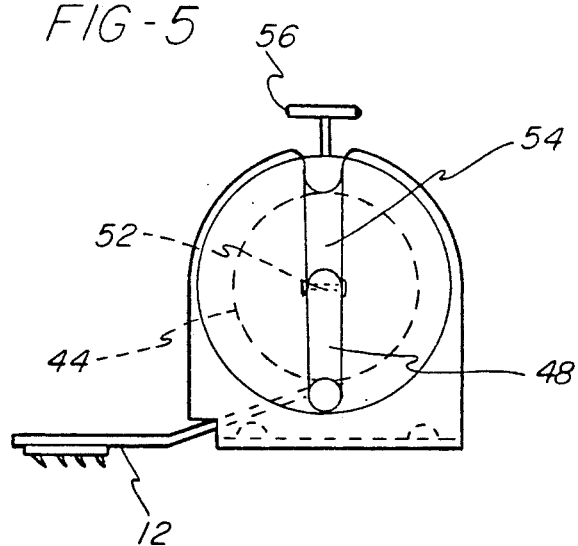

RETRACTABLE CARPET PROTECTOR FOR VEHICLES

BACKGROUND OF THE INVENTION

The present invention relates to a protective cover for protecting the carpeting in vehicles and, more particularly, to a retractable protector which may be used in vehicles having a cargo area with removable seats.

Vehicles which have been classified as minivans have been popular for several years, and recently a new version of the minivan has been introduced which allows the passenger seats behind the front seats to be removed in order for the minivan to be used as an all purpose cargo carrier. Since these minivans or all purpose vehicles are also intended to be family vehicles, they are typically provided with attractive carpeting which, under normal circumstances, would require regular maintenance.

One solution to protecting the carpeting in vehicles is to provide mats placed in areas where people most commonly place their feet. However, in a vehicle such as a minivan in which one or more of the seats may be removed, it would be difficult to provide mats which could be adapted to the different configurations of exposed carpeting which would be provided by the various removed seats.

Furthermore, it would typically be cumbersome to remove the several mats when it is desired to use the vehicle for occasions with the carpeting fully exposed. Also, it is not always possible to predict the occasions when a mat or tarp will be needed to protect the carpeting such that on several occasions the carpeting may go unprotected and become soiled for lack of availability of a tarp or mat.

Accordingly, a protective covering device is needed for use with vehicles such as minivans having removable seats. Further, a protective covering is needed for protecting the interior of vehicles wherein the covering may be easily stored within the vehicle and deployed as needed.

In addition, there is a need for a protective covering for the interior of minivans in which one or more seats may be positioned within the vehicle with the protective covering in place.

SUMMARY OF THE INVENTION

The present invention provides a retractable carpet protector which is particularly designed for vehicles having removable seats such that the vehicle may be used alternatively for carrying passengers or cargo.

A protective mat is provided for use with the interior carpeted floor of the vehicle wherein the mat includes a flexible substantially planar mat body having opposing first and second ends and opposing top and bottom surfaces. A storage assembly is also provided including a rod member attached to the first end of the mat and means for supporting the rod member for rotation.

Fastening means are attached to the bottom surface of the mat at the second end for attaching the mat body portion to the carpeted floor such that the area of the body portion extending from the fastening means to a location adjacent to the storage assembly rests in substantially flat overlying relationship to the carpeted floor. Means are provided for rotating the rod to retract the body portion into the storage assembly whereby the mat may be stored in a compact configuration wrapped around the rod. The retraction mechanism may be of a torsion spring type such as that used to retract window shades or may be in the form of a hand crank extending outwardly from one end of the storage assembly.

The fastening means may be in the form of hook fasteners such as are used for hook and loop fastening devices. Upon engaging the pile of the carpeted floor, the hook fasteners will hold the second end of the body portion at any desired position along the carpeted floor.

Further, a plurality of elongated slits extending lengthwise of the body portion may be provided for permitting the seat mounting post of the vehicle seats to pass through the mat such that the mat may be used with the seats in position.

Thus, it is an object of the present invention to provide a carpet protecting mat for a vehicle which may be conveniently carried in the vehicle at all times.

It is a further object of the invention to provide a protective mat which may be quickly extended as needed and retracted at the conclusion of its use.

Another object of the invention is to provide a mat in which varying lengths of the mat may be used while the unused portion of the mat remains stored away.

It is also an object of the invention to provide a mat for use with a vehicle having removable seats wherein one or more of the seats may be positioned within the vehicle with the mat in place extending over the floor.

Other objects and advantages of the invention will be apparent from the following description, the accompanying drawings and the appended claims.

BRIEF DESCRIPTION OF THE DRAWINGS

FIG. 4 is a cross-sectional elevational view showing a mechanism for retracting the mat into a housing in which the thickness of the mat body is shown exaggerated;

FIG. 5 is an end view of the mechanism of FIG. 4;

DETAILED DESCRIPTION OF THE PREFERRED EMBODIMENTS

Figure 1:
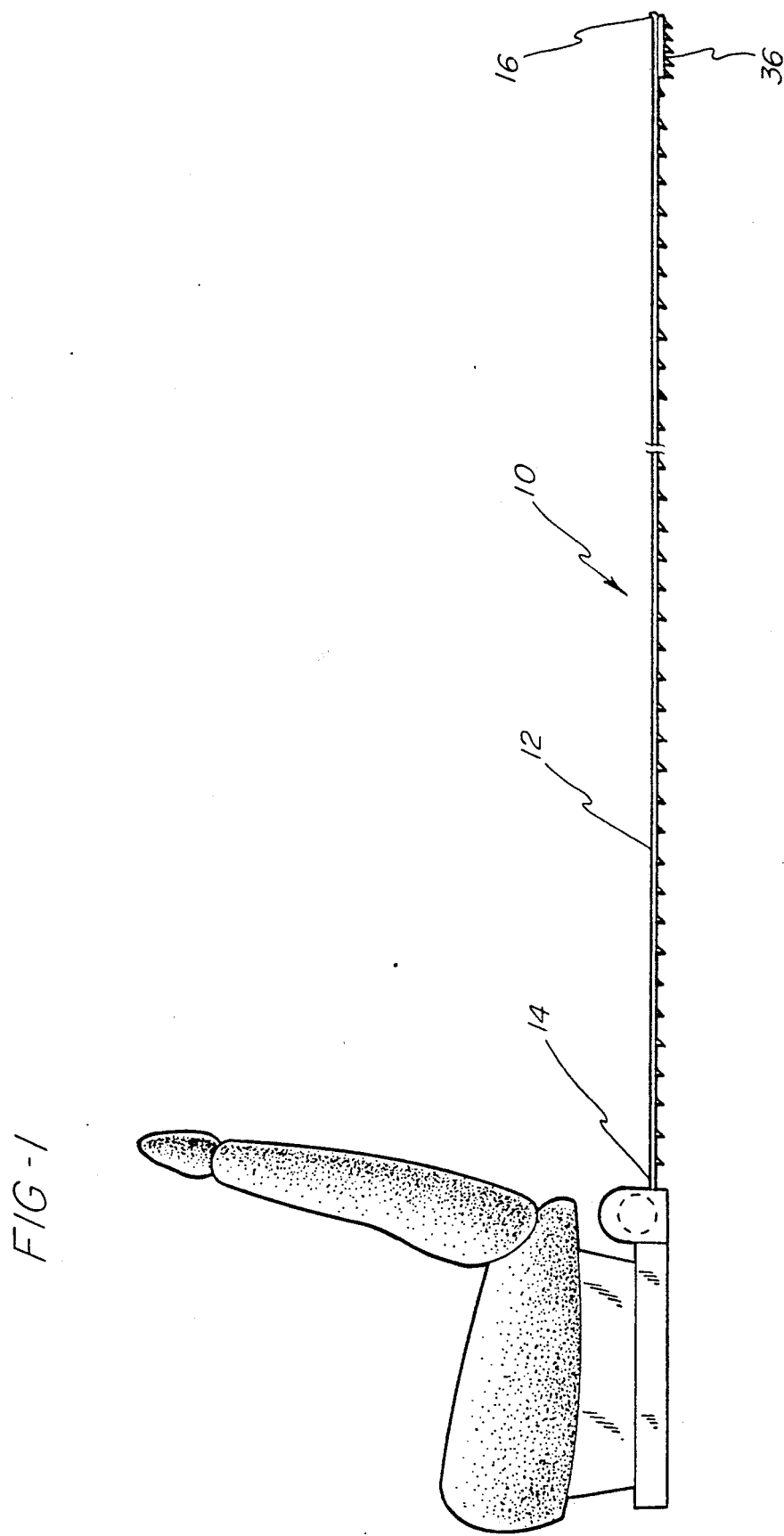
FIG. 1 is an elevational view of the invention shown installed behind a seat with the mat extended.
Figure 2:
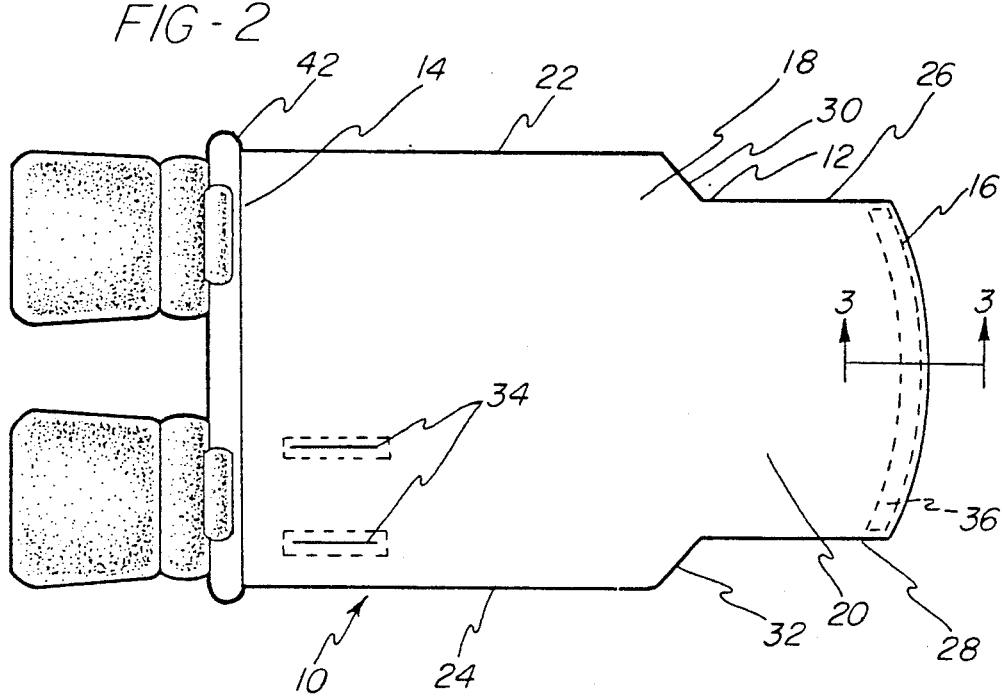
FIG. 2 is a plan view showing the apparatus of the present invention installed behind the front seats of a vehicle with the mat extended.

Referring to FIGS. 1 and 2, the assembly 10 of the present invention includes a mat body 12 for substantially overlying the carpeted surface of an interior of a minivan or all purpose vehicle. The mat body 12 is substantially planar and includes a first forward end 14 and an opposing second rearward end 16. Further, the mat body 12 is preferably formed of a plastic material having a high degree of flexibility.

The mat body 12 is further defined by a wide forward portion 18 adjacent to the first end 14 and a narrow rear portion 20 adjacent to the second end 16. The forward portion 18 includes parallel side edges 22, 24 and the rear portion includes side edges 26, 28 parallel to the forward portion edges 22, 24.

Thus, the area outside of the rear portion side edges 26, 28 is defined as cut-out areas for receiving the wheel wells of the vehicle behind the forward portion 18, and angled transition edges 30, 32 may be provided between adjacent side edges 22, 26 and 24, 28 of the forward and rear portions 18, 20.

As seen in FIG. 2, the mat body 12 may be provided with a plurality of slits 34 whereby the support posts for seats can pass through the mat body 12 to engage within the floor of the vehicle. The number and location of slits 34 will vary depending on the particular seat configuration provided by the vehicle. In any event, the slits 34 are preferably elongated with the direction of elongation extending substantially parallel to the sides 22, 24, 26, 28 of the mat body 12. In addition, the slits 34 are reinforced by a conventional means such as a layer of additional material lying around the periphery of the slit to prevent tearing of areas surrounding the slit.

The second or rear edge 16 of the mat body 12 is provided with a fastener area 36 extending substantially the entire width of the narrow rear portion 20. This area is provided with a plurality of fasteners for attaching to the carpeting of the vehicle and may be in the form of a plurality of small blunt plastic hooks 37 for engaging in the pile of the carpeting 39 or may in the form of conventional hook and loop fastener means such as Velcro.

Figure 3:
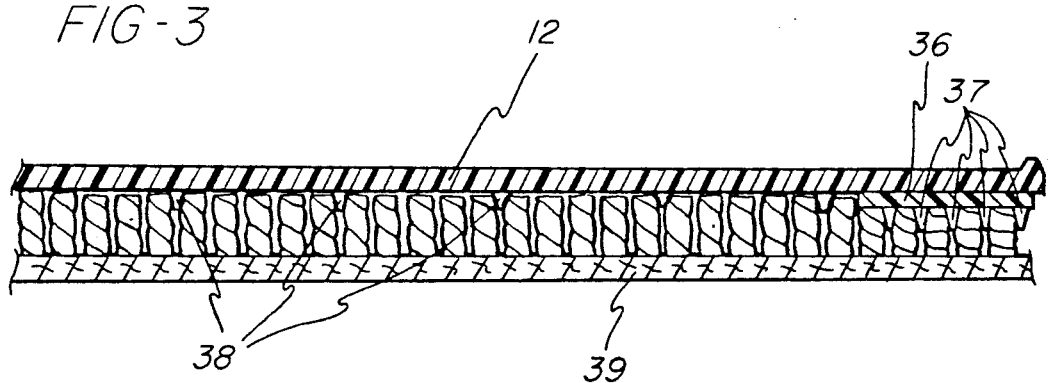
FIG. 3 is a cross-sectional view taken along line 3—3 in FIG. 2 showing the means for holding the mat in place on carpeting within a vehicle.

As may be seen in FIG. 3, the fastener area 36 will hook into the pile of the carpeting 39 to maintain the mat body 12 in a substantially flat or planar relationship to the carpeting 39. Any type of fastener may be used which will engage the carpeting pile and will substantially prevent movement of the mat body 12 in a direction parallel to the surface of the carpeting 39 while permitting easy removal of the fastener area 36 from the carpeting 39 when the mat body 12 is lifted perpendicularly from the surface of the carpeting 39.

The mat body 12 is further provided with small blunt prongs 38 extending from the lower surface thereof. The prongs 38 are distributed substantially uniformly over the entire area of the mat body 12 and act to resist and limit movement of the mat body 12 in a shear direction parallel to the carpet surface. The blunt prongs 38 do not hook into the pile of the carpeting 39 but merely increase the frictional contact between the mat body 12 and the carpeting, particularly when a weight is applied to the top surface of the mat body 12, to thereby limit slipping between the carpeting and the mat body 12.

Referring to FIG. 4, the assembly 10 of the present invention further includes a rod 40 and the first end 16 of the mat body 12 is attached to the rod 40. The rod 40 is mounted within a housing 42 where it is supported for rotation such that the mat body 12 may pass through a slot in the housing 42 and be wound around the rod 40. In the preferred embodiment, the housing 42 is mounted by conventional fasteners to the floor of the vehicle directly behind the front seats (see FIGS. 1 and 2) such that the mat body 12 may be extended out of the housing 42 the full length of the rear passenger area for the vehicle.

A mechanism for retracting the mat body 12 into the housing 42 is provided at one end of the housing 42 and includes a rotatable bearing wheel 44 rigidly attached to a cap member 46, and a handle 48 for manually rotating the cap member 46 and bearing wheel 44. The cap member 46 is preferably formed as a dome-shaped member and the handle 48 is preferably curved such that one surface 50 thereof substantially matches the curvature of the cap member 46. The handle 48 is pivotally mounted to the cap member 46 by means of a pivot pin 52 (see FIG. 5) such that the handle 48 may be pivoted and nested into a slot 54 formed in the domeshaped member when not in use, and may be pivoted outwardly to the position shown in FIG. 4 when it is desired to rotate the rod 40.

In addition, a thumb screw 56 is provided extending through the housing 42 to a position adjacent to a groove formed in the bearing wheel 44. When it is desired to lock the rod 40 against rotation, the thumb screw 56 is rotated into contact with the bearing wheel 44 to thereby lock the assembly in position such that movement of the mat body 12 into or out of the housing 42 is prevented.

Figure 6:
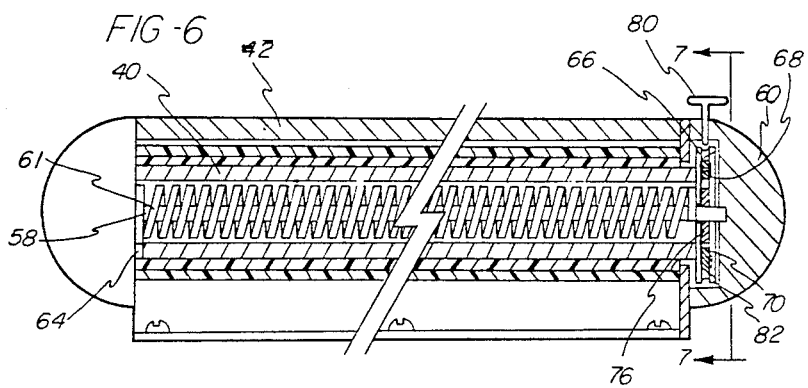
FIG. 6 is an elevational view in partial crosssection of an alternative mechanism for retracting the mat into a housing in which the thickness of the mat body is shown exaggerated and the bearing wheel is partially cut away.

FIG. 6 shows an alternative mechanism for retracting the ma body 12 into the housing 42 which mechanism substantially resembles the mechanisms used for retracting window shades. The mechanism includes a shaft 58 extending the length of the housing 42 and non-rotatably engaged with the end cap 60 and the cap 60 is in turn nonrotatably engaged with the housing 42. A torsion spring 61 extends over the shaft 58 and within the rod 40 and has a first end 62 fixedly attached to the shaft 58 and a second end 64 fixedly attached to the rod 40. The spring 61 is mounted such that rotation of the rod 40 permitting the mat body 12 to be extended out of the housing 42 results in the spring 61 becoming tensioned.

A latch plate 66 is attached to the end of the rod 40 adjacent to the first end 62 of the spring 61 and is mounted for rotation with the rod 40 relative to the shaft 58. As may be best seen in FIG. 7, the latch plate 66 carries a pair of latches 68, 70 mounted by respective pivot pins 72, 74 to the latch plate 66. The pins 72, 74 permit the latches 68, 70 to move freely toward and away from the center of the latch plate 66.

Figure 7:
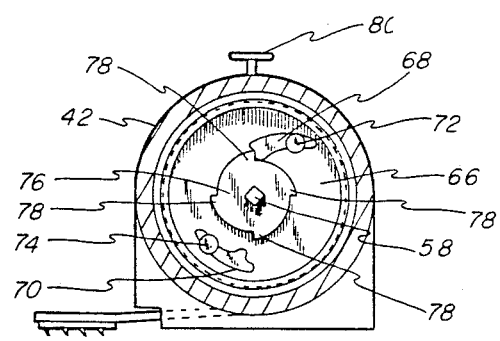
FIG. 7 is a cross-sectional view taken along line 7—7 in FIG. 6 in which an upper portion of the latch plate is cut away to show the groove in the bearing wheel.

A gear plate 76 is mounted to the shaft 58 and is thereby held against rotation. The gear plate 76 includes a plurality of radially extending cam stops 78 which are adapted to engage the latches 68, 70 during rotation of the latch plate 66 with the rod 40. Thus, if the rod 40 and latch plate 66 are rotated slowly enough, one of the latches 68, 70 will be drawn downwardly by gravity to engage against a radially extending face of one of the cam stops 78 whereby further rotation of the rod 40 in a counterclockwise direction, as seen in FIG. 7, will be prevented. However, by pulling the mat body 12 quickly out of the housing 42, the latches 68, 70 will be thrown outwardly by the cam surfaces of the cam stops 78 and will be held in an outward location by centrifugal force as long as the rod 40 is rotating at a certain minimum velocity.

As in the previous mechanism, a thumb screw 80 is provided for engaging a bearing wheel 82 formed on the outer circumference of the latch plate 66. Rotation of the thumb screw 80 inwardly will result in the screw engaging a groove within the bearing wheel 82 to thereby prevent rotation and lock the rod 40 in place to prevent inadvertent movement of the mat body 12 into or out of the housing 42.

It should be noted that the latches 68, 70 will fall into engagement with the cam stops 78 as a result of gravity acting on the latches 68, 70 when they travel across the upper half of the gear plate 76. In addition, it should be noted that the end of the shaft 58 is formed with a square or non-circular cross-sectional shape in order to insure that no relative rotation takes place between the shaft 58, the gear plate 76, and the cap member 60.

It should be apparent from the above description that the present invention provides a protective mat for the interior of an automobile which can be extended at a moments notice to provide protection for the carpeting. Further, the end of the mat is provided with means for attaching the mat directly to the carpeting whereby the mat may be extended and attached to the carpeting at any point along the length of the cargo area of the vehicle. Also, since the body portion of the mat is formed from a plastic material, the extended mat is easily swept, cleaned and dried then retracted until needed again.

An additional advantage of the present invention is provided by the housing for the mat when the housing is mounted to the floor behind the front seats. In this position, the housing may form a footrest for the passengers sitting in seats directly behind the front seats.

In addition, it should be noted that the housing may be mounted to other locations such as to the stationary rear post for mounting the front seats or, where the passenger seats fold forward to form a cargo area, the housing may be mounted to the upper portion of the forwardmost rear seat whereby the housing will be located directly behind the front seats when the rear seats are folded down. Alternatively, the housing may be located beneath the floor board of the vehicle such that the mat may be drawn by through a slot formed in the floor.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A protective mat for use in a vehicle having an interior carpeted floor, said mat comprising:
   a flexible substantially planar body portion having opposing first and second ends and opposing top and bottom surfaces,
   a storage assembly including a rod member attached to said first end and means for supporting said rod member for rotation,
   fastening means attached to said bottom surface at said second end for attaching said body portion to said carpeted floor such that said body portion rests in substantially flat overlying relationship to said carpeted floor from said fastening means to a location adjacent to said storage assembly, and
   including at least open slit formed in said body portion for permitting a support member for a vehicle seat to pass through said mat to said floor.

2. The mat of claim 1 wherein said fastening means comprises a plurality of small blunt hooks for attaching to pile of carpeting.

3. The mat of claim 1 including a plurality of blunt projections protruding from said bottom surface between said fastening means and said storage means for resisting sliding movement between said body portion and said carpeted floor when objects engage and force said top surface downwardly and sideways.

4. The mat of claim 1 wherein said at least one slit is an elongated slit extending in a direction from said first to said second end.

5. The mat of claim 1 wherein said body portion includes opposing side edges and a portion of each of said side edges is cut out to accommodate a wheel well of said vehicle.

6. The mat of claim 5 wherein said cut out portion of said side edges extends from said second end toward said first end.

7. The mat of claim 1 including means for rotating said rod member to retract said body portion into said storage assembly.

8. The mat of claim 7 wherein said means for rotating comprises a crank member connected to an end of said rod member.

9. The mat of claim 7 wherein said means for rotating comprises a spring mechanism for automatically retracting said body portion.

10. The mat of claim 9 wherein said spring mechanism includes a torsion spring located within said storage assembly.

11. A protective mat for a vehicle having an interior carpeted floor, said mat comprising:
    a flexible substantially planar body for extending over said carpeted floor, said body having opposed first and second ends and including a wide forward portion adjacent to said first end and a narrow rear portion adjacent to said second end, said forward and rear portions having substantially parallel side edges,
    a rod extending at least the width of said wide forward portion, said body being attached to said rod at said first end,
    means mounting said rod for rotation about a longitudinal axis of said rod such that said rod may be rotated to wind said body about said rod for storage of said body,
    a housing surrounding said rod for containing said body when said body is wound about said rod,
    hook fasteners extending across said second end of said body, said hook fasteners facing downwardly from a bottom surface of said body for engaging said carpeted floor to hold said rear edge of said body in position when said body is extended over said floor,
    a plurality of prongs extending from said bottom surface of said body across substantially the entire area of said body for contacting said carpeted floor and inhibiting movement of said body relative to said floor,
    a plurality of elongated slits formed in said body and extending substantially parallel to said side edges, said slits including reinforced edge portions and located to receive seat mounting posts therethrough, and
    wherein said wide body portion is adapted to extend to locations adjacent to walls of said vehicle interior and said narrow body portion is adapted to pass between wheel wells for said vehicle and wherein said hook fasteners may directly engage the carpeted floor at any point between said rod and a rearwardmost extension of said body to fasten said body to said carpeted floor.

12. The mat of claim 11 including a crank extending from an end of said rod and outside of said housing whereby a person may rotate said rod to wind said body around said rod.

13. The mat of claim 11 including spring means for biasing said rod to rotate whereby said body may be wound around said rod upon actuation of said spring means.

14. A protective mat for use in a vehicle having an interior carpeted floor, said mat comprising:
- a flexible substantially planar body portion having opposing first and second ends and opposing top and bottom surfaces, and
- means located distal from peripheral edges of said body portion for defining at least one slit formed in said body portion between said first and second ends and extending through said mat from said top to said bottom surface for permitting a support member for a vehicle seat to pass through said mat to said carpeted floor when said bottom surface of said mat is positioned in overlying relationship and in contact with said carpeted floor.

15. The mat of claim 14 including storage means for storing said body portion when said mat is not in use.

16. The mat of claim 14 including fastening means attached to said bottom surface for attaching said body portion to said carpeted floor.

17. The mat of claim 16 including storage means engaging said first end of said body portion for storing said body portion when said mat is not in use and wherein said fastening means is attached to said body portion at said second end such that said body portion rests in substantially overlying relationship to said carpeted floor from said fastening means to said storage means.

* * * * *

UNITED STATES PATENT AND TRADEMARK OFFICE
CERTIFICATE OF CORRECTION

PATENT NO. : 5,152,572
DATED : October 6, 1992
INVENTOR(S) : Larry D. Ellis

It is certified that error appears in the above-identified patent and that said Letters Patent is hereby corrected as shown below:

Column 5, line 52, "open" should be --one--.

Signed and Sealed this

Fourteenth Day of September, 1993

Attest:

BRUCE LEHMAN

Attesting Officer

Commissioner of Patents and Trademarks